US008223350B2

(12) United States Patent
Mashtare et al.

(10) Patent No.: US 8,223,350 B2
(45) Date of Patent: Jul. 17, 2012

(54) SYSTEM AND METHOD FOR MINIMIZING VISIBILITY OF PRINT DEFECTS

(75) Inventors: Dale Robert Mashtare, Bloomfield, NY (US); Dan Rene Rasmussen, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1362 days.

(21) Appl. No.: 11/358,663

(22) Filed: Feb. 21, 2006

(65) Prior Publication Data
US 2007/0195351 A1 Aug. 23, 2007

(51) Int. Cl.
*G06K 15/00* (2006.01)
*G06K 9/00* (2006.01)

(52) U.S. Cl. ............ 358/1.12; 358/1.14; 358/1.18; 347/19; 382/112

(58) Field of Classification Search .............. 358/1.1, 358/1.9, 3.26; 347/19; 382/112
See application file for complete search history.

(56) References Cited

U.S. PATENT DOCUMENTS

| 6,313,921 | B1* | 11/2001 | Kadowaki | 358/1.15 |
|---|---|---|---|---|
| 2003/0202200 | A1* | 10/2003 | Terrill et al. | 358/1.14 |
| 2004/0177783 | A1* | 9/2004 | Seymour | 101/484 |
| 2006/0092211 | A1* | 5/2006 | Arakawa et al. | 347/19 |
| 2006/0284916 | A1* | 12/2006 | Heiles et al. | 347/19 |
| 2007/0041032 | A1* | 2/2007 | Sugimoto et al. | 358/1.14 |

OTHER PUBLICATIONS

HP Business Inkjet 1200 User Guide, Edition 1, Aug. 2004.*

* cited by examiner

*Primary Examiner* — King Poon
*Assistant Examiner* — Ming Hon
(74) *Attorney, Agent, or Firm* — Simpson & Simpson, PLLC

(57) ABSTRACT

A printing system and method is provided including a printer having an print marking means for printing a printer-ready document, including transferring or applying an image associated with the printer-ready document to a substrate; and a processor assembly in operative communication with the printer. The processor assembly executes application software for receiving a print job request including the printer-ready document. The processor assembly includes a module for accessing print defect data indicating location and color separation information on the print marking means which corresponds to a detected print defect; and a module for modifying the printing in accordance with the print defect data for minimizing visibility of the detected print defect in the printer-ready document once printed.

20 Claims, 3 Drawing Sheets

SYSTEM AND METHOD FOR MINIMIZING VISIBILITY OF PRINT DEFECTS

BACKGROUND

This disclosure relates generally to a system and method for improving the performance of printers, and more particularly to a system and method for minimizing visibility of print defects when printing.

The quality of printed output from printers may be compromised by print defects induced by a defect in the printer, such as due to a problem related to component life, material state or manufacturing issues. For examples in an electrophotographic marking process, an image streak may appear in the printed output due to contamination of a charge scorotron, a scratch on the surface of a photoreceptor, lack of exposure due to contaminated optics, a developer roll meter blade defect, etc. Other print defects may include a registered band, spot defects, graininess, a mottled appearance, lack of color, low frequency color variations, etc. Such print defects may be localized within a region of the printed output, and may reoccur in the same localized region. Furthermore, the print defects and localized region may be described by location and color separation information associated with a print marking means provided for forming the printed output on the substrate.

When a user perceives print defects in printed output, it is probable that the user will request service for the printer causing the print defects. Until the printer is serviced, the print defects may render printed output below a desired quality standard or unusable. The printer may be out of commission while waiting for service and/or during servicing.

To overcome the drawbacks in the prior art, it is an aspect of the present disclosure to provide a system and method for minimizing or eliminating print defects from printed output and for avoiding the need to service the printer.

SUMMARY

Accordingly, it is an aspect of the present disclosure to provide a system and method for minimizing or eliminating print defects from printed output and for avoiding the need to service the printer.

In accordance with an aspect of the present disclosure there is provided a printing system having a printer having a print marking means for printing a printer-ready document, including transferring or applying an image associated with the printer-ready document to a substrate using at least one color plane, and a processor assembly in operative communication with the printer. The processor assembly executes application software for receiving a print job request including the printer-ready document. The processor assembly includes a module for accessing print defect data including at least one of location information indicative of a location associated with the print marking means, color separation information indicative of a color plane of the at least one color plane or combination of color planes of the at least one color plane which corresponds to a detected print defect, and type information indicative of a type of the detected print defect. The processor assembly further includes a module for modifying the printing in accordance with the print defect data for minimizing visibility of the detected print defect in the printer-ready document once printed.

In accordance with another aspect of the present disclosure, there is provided a method for minimizing visibility of print defects when printing using a printer, the printer having an print marking means for printing a printer-ready document, including transferring or applying an image associated with the printer-ready document to a substrate using at least one color plane. The method includes receiving a print job request including the printer-ready document, accessing print defect data including at least one of location information indicative of a location associated with the print marking means, color separation information indicative of a color plane of the at least one color plane or combination of color planes of the at least one color plane which corresponds to a detected print defect, and modifying the printing in accordance with the print defect data for minimizing visibility of the detected print defect in the printer-ready document once printed.

Pursuant to another aspect of the present disclosure, there is provided a processor having a module for receiving a print job request including a printer-ready document, wherein the request is for printing the printer-ready document on a printer having an print marking means, the printing including transferring or applying an image associated with the printer-ready document to a substrate using at least one color plane. The processor further includes a module for accessing print defect data including at least one of location information indicative of a location associated with the print marking means, color separation information indicative of a color plane of the at least one color plane or combination of color planes of the at least one color plane which corresponds to a detected print defect, and type information indicative of a type of the detected print defect, and a module for modifying the printing in accordance with the print defect data for minimizing visibility of the detected print defect in the printer-ready document once printed.

BRIEF DESCRIPTION OF THE DRAWINGS

Various embodiments of the present disclosure will be described herein below with reference to the figures wherein.

DETAILED DESCRIPTION OF THE PREFERRED EMBODIMENTS

Figure 1:
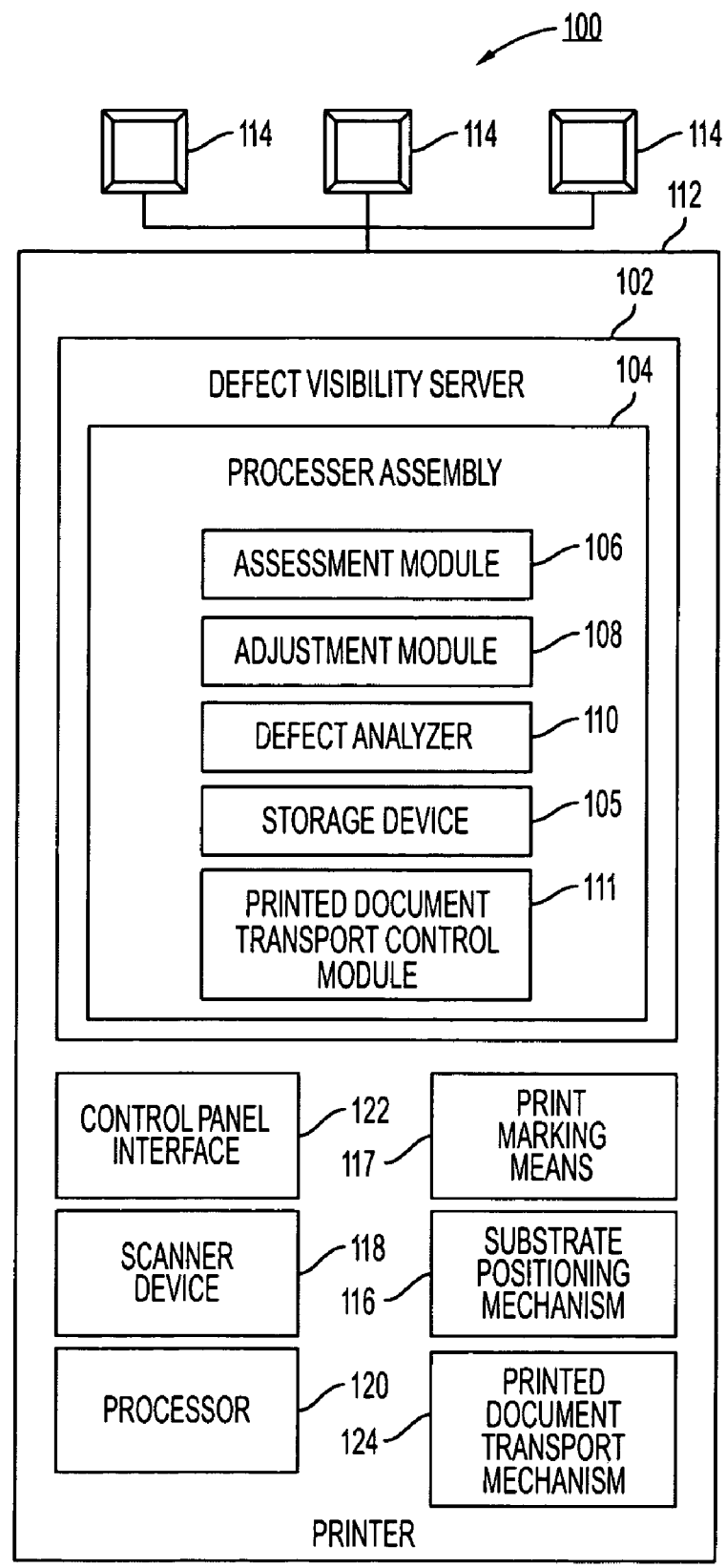
FIG. 1 is a block diagram of an exemplary configuration of a printing system in accordance with the present disclosure.

For a general understanding of the features of the present disclosure, reference is made to the drawings. In the drawings, like reference numerals have been used throughout to identify identical elements. With reference to FIG. 1, an exemplary printing system in accordance with the present disclosure is illustrated and is designated generally as printing system 100. Printing system 100 includes a defect visibility server 102 having a processor assembly 104 which includes at least one processor, at least one storage device 105 accessible by the at least one processor, an image assessment software module 106, an adjustment software module 108, and a print defect analyzer software module 110. The processor assembly 104 may further include an optional printed document transport control module 111.

Each software module, including the image assessment module 106, the adjustment module 108, the print defect analyzer module 110, and the printed document transport control module 111 includes a series of programmable instructions capable of being executed by the processor assembly 104. The series of programmable instructions can be stored on a computer-readable medium, such as RAM, a hard drive, CD, smart card, 3.5" diskette, etc., or transmitted via propagated signals for being executed by the processor assembly 104 for performing the functions disclosed herein and to achieve a technical effect in accordance with the disclosure. The functions of the respective software modules may be combined into one module or distributed among a different combination of modules.

FIG. 1 shows the defect visibility server 102 integrated with a printer 112 and at least one computer terminal 114. Alternatively, the defect visibility server 102 or a portion thereof may be in operative communication with the printer 112. The printer 112 is provided with a substrate positioning mechanism 116 and a print marking means 117, and may further be provided with an optional scanning device 118, a processor 120, a control panel interface 122 and/or an optional printed document transport mechanism 124.

The word "printer" as used herein encompasses any apparatus or system, such as a digital copier, xerographic printing system, inkjet printing system, reprographic printing system, bookmaking machine, facsimile machine, multifunction machine, a color printer, a black and white printer, a mixed engine type printer (e.g., a rack mounted printer), etc., which performs a print outputting function for any purpose. Additionally, the term "printer" as used herein encompasses any apparatus or system that transfers or applies marks corresponding to the input image to a substrate using a modality for forming the transferred or applied image, such as toner, ink, dye, embossing, peening, etching, etc., and a substrate, such as paper, cardboard, paper derivative, metal, plastic, glass, wood, cloth, etc. The term "printing" includes transferring or applying at least one image to a substrate. The at least one image may correspond to received data, such as a file including a document, where the document may have one or more pages.

The printer 112 transforms a printer-ready document into an image that is transferable to a substrate. The printer-ready document is a document that has been processed to be ready for printing. The printer-ready document may refer to data at various points along a print path in which a document is processed in preparation for printing. In one example, the printer-ready document includes an image file provided from a digital front end (DFE) controller to the print engine controller in which the image is rasterized into a plurality of one bit files, each file corresponding to a respective color separation. The image file may further include at least one positioning instruction, such as an orientation instruction that selects an orientation, e.g., a landscape or portrait orientation. When the document is a multi-paged document, the printer-ready document may include an image to correspond to each page of the multi-paged document. Upon printing, the printed document will include each image printed on a different page, in simplex or duplex fashion.

The print marking means 117 includes at least one component for transferring and/or applying an image to a substrate. For example, the print marking means 117 includes a component for depositing a substance to the substrate or an image transfer area, such as ink, toner or an etching medium (e.g., a mask or chemical etching substance) or for applying a force to the substrate for changing the shape of the substrate, e.g., for embossing or peening. For example, the print marking means may include a thermal or piezoelectric print head, laser raster output scanner (ROS) or LED bar, photoreceptor, developer unit, transfer station, fixing station, etc. The print marking means 117 may be used to directly mark the final substrate, or alternatively to first build the image upon an image receiver, e.g., a transfer intermediate layer, also referred to as an image transfer area, such as a photoreceptor, from which the marking material is transferred to the final substrate.

The substrate positioning mechanism 116 includes a mechanism that receives control signals from the at least one processor 120 of the printer 112 for controlling its operation for positioning the substrate relative to the print marking means 117 and/or for providing the substrate to be a selected size and/or type. The positioning of the substrate may include orienting the substrate relative to the print marking means 117 (e.g., in a portrait or landscape orientation) or by registering or translating the substrate relative to the print marking means 117 (e.g., by adjusting the position of the substrate relative to the print marking means 117 in a horizontal or vertical direction).

The substrate positioning mechanism 116 may include, for example, a plurality of sources (e.g., paper trays) and means for selecting a substrate source, where different substrate sources may provide a substrate of a different size, type and/or oriented in a different orientation, as is commonly found in many prior art printers. The substrate positioning mechanism 116 may include a mechanism e.g., a conveyor belt and associated motor, mechanical finger assemblies, pneumatic or electrostatic assisted substrate manipulation assemblies, etc., for moving a substrate that was provided by a substrate source relative to the print marking means 117, e.g., by rotating the substrate and/or moving the substrate in a horizontal or vertical position. Additionally, the substrate positioning mechanism 116 may include a mechanism for moving (e.g., rotating or moving in a horizontal or vertical direction) the substrate after printing thereon for positioning the substrate in a desired position for a stacking and/or a finishing operation. Finishing operations may include, for example, collation, trimming, fastening (e.g., stitching or stapling), binding or hole punching. The substrate positioning mechanism 116 receives control signals for controlling its operation.

The control panel interface 122 provides an interface between a control panel (not shown) having user entry devices (e.g., switches, touch-sensitive keys, a touch-sensitive screen, knobs, buttons, etc.) and one or more processors 120 of the printer 112. The processor 120 provides control signals to the substrate positioning mechanism 116 for controlling the substrate positioning mechanism 116. The processor 120 and the processor assembly 104 of the defect visibility server 102 are in operative communication. The processor 120 may include processor assembly 104, or vice versa. Furthermore, the control panel interface 122 of the printer 112 may be in operative communication with the control panel and the at least one processor 120 of the printer 112.

The computer terminals 114 are devices having processing and input/output (I/O) capabilities for transmitting a print job request to the processor assembly 104 of the defect visibility server 102. The processor assembly 104 may receive a print job request from a computer terminal 114 or via operation of the printer 112 by a user. A print job request includes a printer-ready document (e.g., a document in printer-ready format), e.g., an image file, and job set-up parameters. The document may include one or more pages.

The job set-up parameters provide parameters for execution of printing the printer-ready document, and may include parameters for the entire document or for individual pages of the document. Parameters of the job set-up may specify a paper source, orientation of the substrate relative to the print marking means 117, size of the substrate, position of the image with respect to the substrate, position of the substrate with respect to the print marking means 117 (e.g., top, bottom, left or right justified), orientation of at least a portion (e.g., a page) of the printer-ready document (e.g., by rotating the image 90 or 180 degrees), simplex or duplex printing, and/or finishing instructions. The computer terminals 114 may also include a user input device (UID) e.g., keyboard, mouse, touch pad, etc., and/or a display device (not shown) for allowing a user to input information. The UID and display device may interact, such as via a graphical user interface (GUI).

When the printer 112 is operated by a user for copying, including printing a copy of a document, the printer 112 scans the document with its scanning device 118. The scanning device 118 acquires an image of the document being copied which is formatted into a corresponding printer-ready document, wherein the printer-ready document is included in the job request. Job set-up parameters may be generated by sensing properties of the document, such as the size and orientation of the document as laid by the user on a scan plate of the printer 112 for scanning thereof, by user entered data entered by the user, such as via the control panel of the printer 112 and/or by default values (e.g., 8½×11", portrait orientation, top and left justified and image upright). The scanning device 118 may be exterior to the printer 112 and in operative communication with the printer 112. The printer-ready document generated by the scanning device 118 may be transmitted from the scanning device 118 to the printer 112.

The printer 112 may have associated with it an anomaly associated with a particular location within its print marking means 117 and/or a particular color plane. A print defect may occur in printed images when printed using the location of the print marking means 117 and/or the color plane associated with the anomaly. Feedback from image analysis of images previously printed by each printer 112 using image analysis techniques, and/or from sensors for sensing anomalies in susceptible components of the printer 112 including the type and/or location of an anomaly, may be used for predicting that a print defect will occur when printing a document with the printer 112. The prediction may include a prediction of the type of print defect (e.g., a fault in a particular color plane such as light or dark streaks or bands), the location associated with the defect (e.g., pixel address within an array of addresses) within the print marking means 117 of the printer 112, and/or the corresponding location, image content, and color associated with a document to be printed).

The print defect analyzer module 110 handles information about print defects from the printer 112 such as by performing an analysis of an image printed by the printer 112, receiving information from a user or a device regarding analysis of an image printed by the printer 112, comparing an analysis to a previously performed or received analysis for the printer 112, and/or analyzing information from sensors sensing anomalies associated with the printer 112. The scanning device 118 of the printer 112 may include a sensor device, such as a full width array of image sensors, that scans an image printed by the printer 112 and provides corresponding image data to the print defect analyzer module 110.

The print defect analyzer module 110 may include an image quality analysis module that performs image analysis upon a document printed by the printer 112 onto a substrate, which includes receiving the image data and job set-up parameters which were used for printing the document whose image is being analyzed, and analyzing the received image data and job set-up parameters. The image quality analysis module may also be provided external to the printer 112. Receiving the job set-up parameters may include assuming default job set-up parameters. A set of default job set-up parameters may be selected from more than one set of default job set-up parameters based on a sensed or input property of the image, such as the size of the image and/or the size of the substrate upon which the image is printed.

The image analysis is used for detecting print defects in the image data, and determining the location(s) within the printer's 112 print marking means 117 and color plane(s) or combination(s) of color planes (e.g., mis-registration of one color plane relative to another color plane) that correspond to the detected print defects, and generating print defect data including location information indicating the determined location(s) and color separation information indicating the determined color plane(s) or combination(s) thereof. The image analysis may include, for example, uniformity analysis of an image having an area printed using a particular color plane or combination of color planes.

Results of the image quality analysis together with the job set-up parameters used for printing the document are used to determine the location(s) and color separation information on the print marking means 117 of the printer 112 that correspond to the detected print defects found in the analysis. The results of the analysis performed by the image quality analysis module may be provided to the print defect analyzer module 110 via a communication transmission or via user input.

The image analysis may be performed by visual inspection of a document printed by the printer 112. The results of the visual inspection may be provided to the print defect analyzer module 110 via user input describing visually detected print defects. The user input may be provided to the print defect analyzer module 110 via the control panel of the printer 112, or may be provided via a computer terminal 114.

Periodic diagnostic testing may be performed for the printer 112 for establishing and maintaining updated data regarding print defects generated by the printer 112. At least one special diagnostic document may be printed by the printer 112 during a diagnostic test session. The diagnostic document may include a series of pages, with each page dedicated to testing a particular aspect of the printing output. For example, a page may be included that corresponds to each of the color planes used by the printer 112, where each page is a uniform printout using only the color of the corresponding color plane. The diagnostic documents may be printed using different job set-up parameters for positioning the substrate at different positions relative to the print marking means 117 of the printer for testing all or a portion of the locations of the components of the print marking means 117.

The printed diagnostic documents are analyzed for detecting print defects and determining the locations and color separation information on the print marking means 117 that correspond to the detected print defects, such as by processing job set-up parameters used for the printing, together with results of an analysis by an image quality analysis module or a visual inspection. Results of analysis performed externally from the print defect analyzer module 110 are provided to the print defect analyzer module 110 via a communication device and/or user input. The print defect analyzer module 110 determines the type (e.g., which color plane, type of defect (streak, mottled, etc.), location (e.g., geometric region) within the print marking means 117) and extent (e.g., affected pixel addresses along the image transfer area) of each of the detected print defects.

The optional printed document transport mechanism 124 may automatically provide a printed document to the scanner device 118 by transporting the printed document to the scanner device 118, such as via a transport belt. The scanner device 118 scans the provided printed document and generates corresponding image data. The job set-up parameters and generated image data are provided to the defect analyzer 110 for analysis of the image data by the image quality analysis module, detection of print defects in the image data and generation of corresponding print defect data.

The printed document transport mechanism 124 is controlled by the printed document transport control module 111 for controlling automatic provision of a printed document to the scanner device 118. The printed document transport control module 111 may provide for random, periodic (e.g., based on a period such as per time interval or per quantity of printed pages, etc.) and/or conditional provision (e.g., based on a condition, such as a substrate size, colors used in printed document, user request, etc.) of a printed document to the scanner device 118.

Results of analysis of documents printed by the printer 112 are stored as print defect data in storage device 105. When a print job request is received for printing a document, the job request and the printer 112 are assessed for making an adjustment including modifying the orientation of the image to be printed and/or modifying the position of the substrate relative to the print marking means 117 for using a selected portion of the print marking means 117. The adjustment may be performed by modifying the job set-up parameters and/or by providing control signals to the substrate positioning mechanism 116. The objective of the adjustment is to minimize visibility to a human observer of print defects in a printed document caused by anomalies associated with the printer 112.

Determining the visibility of print defects includes determining if any of the detected print defects would be included in the document to be printed by determining if the location of and color separation information of the print marking means 117 corresponding to each of the detected print defects indicated by the print defect data would be included in the portion of the print marking means 117 used for printing the document. If so, the image content to be printed using the locations and color separation information on the print marking means 117 corresponding to detected print defects is taken into consideration. The determination is made by the assessment module 106.

Those skilled in the art will envision various methods performed by the assessment module 106 for determining the degree of visibility of print defects to a human observer in a printed document, including before printing thereof, if printed in accordance with a specific set of job set-up parameters. A quantitative score may be generated that is indicative of the degree of print defect visibility. In accordance with the present disclosure, the determining the degree of visibility of print defects by the assessment module 106 can be performed without actually printing the document, or may be performed by printing the image and—subjecting the printed image to image analysis to determine the degree of defect perceptibility and objectionability—either via automated image quality assessment by an image analysis module (internal or external) which may include using prior art image analysis techniques or visual inspection.

A variety of image analysis techniques may be used for predicting perceptibility and objectionability of print defects in an image before printing of the image, including using prior art image analysis techniques. In one exemplary method performed by the assessment module 106, a simulated image is generated in which the print defect data that corresponds to each location on the print marking means 117 at which a print defect was detected is superimposed on an image corresponding to the received printer-ready document that is to be printed. The assessment module 106 may use a human visual difference model, or the equivalent, for comparing the simulated image with an ideal image (e.g., the received printer-ready document without any print defects) for determining the degree of visibility of detected print defects associated with the printer 112 being assessed when printing the document in accordance with the specific job set-up parameters.

In another exemplary method performed by assessment module 106, instead of creating a simulated image with superimposed print defects, the received printer-ready document is segmented and categorized based upon color content and/or uniformity (or lack thereof, e.g., noisiness). The geometries and dimensional extents of the respective segments are determined. An appropriate human visual system model, such as a model for a macro-uniformity evaluation, is applied, and a quantitative score indicative of the degree of uniformity is assigned to each respective segment. For each print defect that would be included in the document to be printed, a determination is made which segment(s) the print defect lies in. Furthermore, for each print defect included in the document to be printed, the determined segment(s) are examined, including considering the color and/or degree of uniformity score for the determined segment(s) for determining the degree of visibility of detected print defects associated with the printer within the determined segment(s) when printing the document in accordance with the specific job set-up parameters.

The segmented and categorized printer-ready document may be used for assessing print defect visibility (e.g., generating a quantitative score for print defect visibility). The assessment includes considering the content of the received printer-ready document and one or more sets of modified job set-up parameters, and selecting the set of modified job set-up parameters that corresponds to the lowest print defect visibility.

In still another exemplary method performed by the assessment module 106, t the content of the received printer-ready document to be printed at the determined locations of the print marking means 117 that correspond to each of the print defects is examined, e.g., for uniformity and color. The examination takes into consideration the type (e.g., color, intensity, size) of each of the detected print defects. Based on the examination, the degree of visibility is determined for the detected print defects associated with the printer when the document is printed in accordance with a specific set of job set-up parameters.

The adjustment module 108 makes an adjustment for decreasing visibility of the print defect(s) via modifying the job set-up parameters and/or controlling the substrate positioning mechanism 116. The adjustment includes adjusting the positioning of the substrate to be printed on relative to the print marking means 117 (e.g., rotating and/or translating the substrate relative to the print marking means 117), and/or modifying the printer-ready document.

Modifying the printer-ready document may includes making an adjustment to the printer-ready document that will decrease the visibility of the detected at least one print defect when the printer-ready document is printed. For example, the adjustment may include adjusting the orientation of the image to be printed, such as by rotating the image, e.g., 90 or 180 degrees; changing the format of the image to be printed, etc. Different adjustments may be made for individual pages of the document, including for simplex or duplex printing. Additionally, the adjustment may include changing the color and content of the image to be printed (e.g., the formatting or the size of an element of the image to be printed (e.g., a section of text, a picture, an image)). The adjustment may be performed interactively with the user and upon user approval. After making an adjustment, the document may be printed, or alternatively, the assessment module 106 may evaluate the document with the adjustments before printing the document for determining if the degree of visibility of detected print defects is acceptable. If the degree of visibility is not acceptable, another adjustment is made by the adjustment module 108, and the new adjustment may be evaluated by the assessment module 106 before printing the document. The adjusting and evaluating process may be repeated without printing the document, e.g., a predetermined number of times, until a predetermined time interval is used up, or an acceptable degree of visibility is achieved. The assessment module 106 may segment the received printer-ready document (e.g., as described above) if not already done so, for evaluating visibility of detected print defects after an adjustment is made.

Adjustments made by the adjustment module 108 include, for example, modifying the job set-up parameters (which may control orientation of the image to be printed, actions to be taken by the substrate positioning mechanism 116 of the selected printer 112 (e.g., selection of a paper source or moving the substrate relative to the print marking means 117)) and/or sending control signals to the substrate positioning mechanism 116. Rotating the received printer-ready document prior to printing may include, for example, rotating the image by 90 degrees for changing between portrait and landscape orientations, or rotating the image by 180 degrees for inverting the received printer-ready document.

The substrate positioning mechanism 116 can be controlled for at least one of the following: selecting a different substrate source, e.g., a paper tray, such as for selecting a different size paper source or a paper source that is oriented in a different direction relative to the print marking means 117 (such as for changing between portrait and landscape orientations); rotating the substrate in a clockwise or counter clockwise direction relative to the print marking means 117; and translating the substrate in at least one of a vertical or horizontal direction relative to the print marking means 117 for changing the position and/or justification (i.e., top, bottom, left and/or right) of the substrate on the print marking means 117. When a finishing procedure is specified by the job set-up parameters, it may be necessary to modify the finishing procedure (e.g., place the staple in a different corner of the document) or to rotate or translate the substrate after printing and prior to stacking the printed pages and/or performing the finishing procedure in order to compensate for manipulation of the image or substrate that was performed before printing.

The adjustment module 108 may select the adjustment from a stored list of possible adjustments, such as by selecting the next adjustment on the list, simulating the adjustment by changing the job set-up parameters and reevaluating the visibility of the detected print defects with the adjusted job set-up parameters. If it is determined that the visibility of the detected print defects is below a predetermined threshold, then the document is printed using the job set-up parameters that correspond to the last adjustment made. Otherwise, the next adjustment on the list is selected, and the procedure is repeated. If the visibility of the detected print defects is above the threshold for all of the adjustments tested, the adjustment with the least visibility is selected.

Alternatively, an intelligent adjustment may be made by the adjustment module 108 by taking into consideration the location and color separation information of the various detected print defects on the print marking means 117, the content of the received printer-ready document and the possible adjustments, and selecting an adjustment that would provide a printed document with the lowest degree of visibility of print defects. Once the adjustment is selected, job set-up parameters that correspond to the adjustment are used for printing the received printer-ready document.

With reference to FIGS. 2A-2D, a representation of an image transfer (or image generation) area 202 of the print marking means 117, and a substrate 204 upon which a document is to be printed are shown. The representations may each exemplarily be represented as an array of coordinates, e.g., pixels, however other representations may be used. Print defects A, B and C along image transfer area 202 have been detected by analysis of previously printed images printed by the printer 112. Print defect data relating to print defects A, B and C is stored.

Three scenarios are described below in which a print job request is received, including a printer-ready document and job set-up parameters for printing the document. The job set-up parameters for all three scenarios specify that the document should be printed with a portrait orientation, the printer-ready document upright and the substrate 204 left justified against the image transfer area 202. The content of the document is different for each scenario. For all three scenarios, the assessment module 106 determines that in accordance with the present job set-up parameters, the print defects A and B would be included in a portion of the image transfer area 202 that would be used for printing of the document. While FIGS. 2A-2D illustrate moving the substrate relative to the image transfer area 202, the present disclosure is also directed to an equivalent adjustment, such as moving the substrate relative to another component of the print marking means 117, such as a component for depositing a marking substance to the substrate or for applying a force to the substrate for changing the shape of the substrate.

Figure 2A:
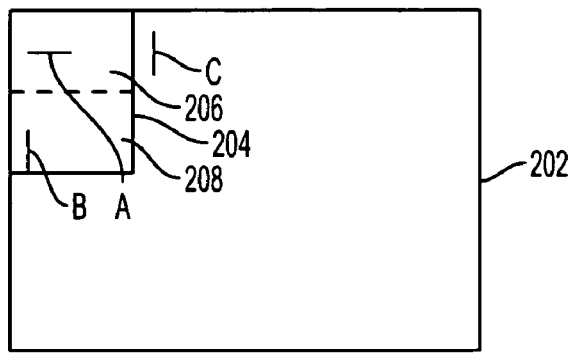
FIGS. 2A-2D are schematic diagrams of an image transfer area of a print marking means and a substrate, where the substrate is positioned on the image transfer area in a variety of positions for minimizing visibility of print defects in a printed document in accordance with a system and method of the present disclosure.
Figure 2B:
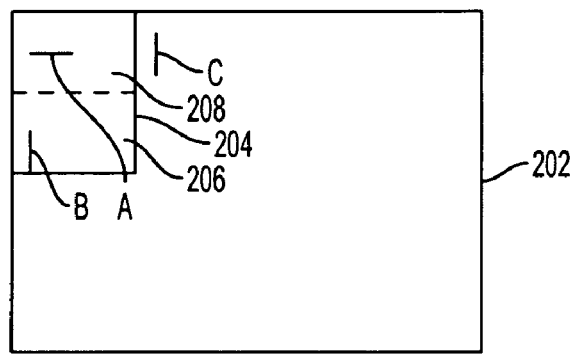

The first scenario is described with reference to FIGS. 2A and 2B in which the document has a first set of content. The assessment module 106 examines the content of the document and the type and extent (e.g., size) of the print defects A and B, and determines accordingly that the print defects A and B would have a high degree of visibility if the document were printed, and that an adjustment is required. The adjustment module 108 determines that the content in the lower portion 208 of the document includes content in which the print defect A would have a low degree of visibility, since, for example, the defect A is due to a defect in one color plane, and the colors used in the lower portion 208 do not use that color plane. The upper portion 206 of the document includes content in which the print defect B would have a low degree of visibility, since, for example, the content associated with the upper portion 206 is relatively dark with a high degree of uniformity, which would conceal print defect B well. Accordingly, the adjustment module 108 modifies the job set-up parameters for rotating the image corresponding to the printer-ready document 180 degrees before printing the document. The result is shown in FIG. 2B, where the printer-ready document has been rotated for minimizing the visibility of print defects A and B.

Figure 2C:
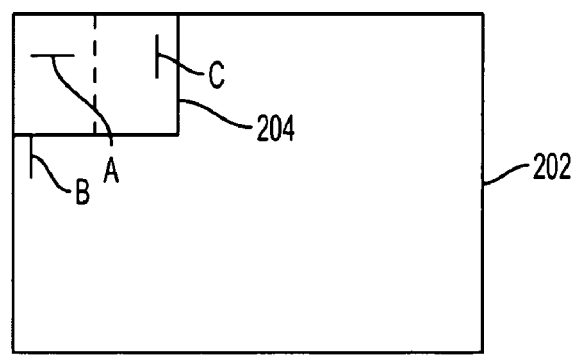

The second scenario is described with reference to FIGS. 2A and 2C in which the document has a second set of content. The assessment module 106 examines the content of the document and the type and extent of the print defects A and B, and determines accordingly that the print defect A would have a low degree of visibility, and print defect B would have a high degree of visibility if the document were printed, and that an adjustment is required. The adjustment module 108 determines that print defect B will not be included in the document if the document is printed with a landscape orientation, and that the degree of visibility of print defect B is still acceptable (e.g., satisfies a predetermined condition, such as below a threshold value). However, the adjustment module 108 realizes that print defect C will be included in a portion of the image transfer area 202 that would be used by the document when printed with a landscape orientation. Furthermore, the adjustment module 108 determines that the degree of visibility of print defect C in the document once printed would be acceptably low. Accordingly, the adjustment module 108 modifies the job set-up parameters for rotating the printer-ready document 90 degrees, and selecting a different paper tray as a source for the substrate 204, in order that the substrate 204 orientation is also rotated by 90 degrees. The result is shown in FIG. 2C, where the document is oriented in a landscape orientation for minimizing and/or eliminating the visibility of print defects A, B and C.

Figure 2D:
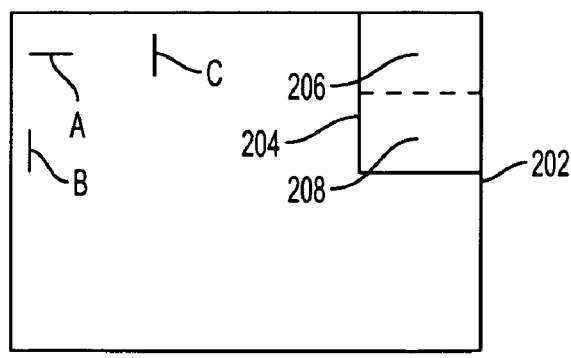

The third scenario is described with reference to FIGS. 2A and 2D in which the document has a third set of content. The assessment module 106 examines the content of the document and the type and extent of the print defects A and B, and determines accordingly that the print defects A and B would both have a high degree of visibility if the document were printed, and that an adjustment is required. The adjustment module 108 determines that print defects A, B and C will not be included in the document if the document is printed using job set-up parameters for right justifying the substrate 204 against the image transfer area 202 when printing the document. Accordingly, the adjustment module 108 modifies the job set-up parameters for right justifying the substrate 204 against the image transfer area 202. The result is shown in FIG. 2D, where the substrate 204 for printing the document is right justified against the image transfer area 202 for eliminating the visibility of print defects A, B and C.

Figure 3:
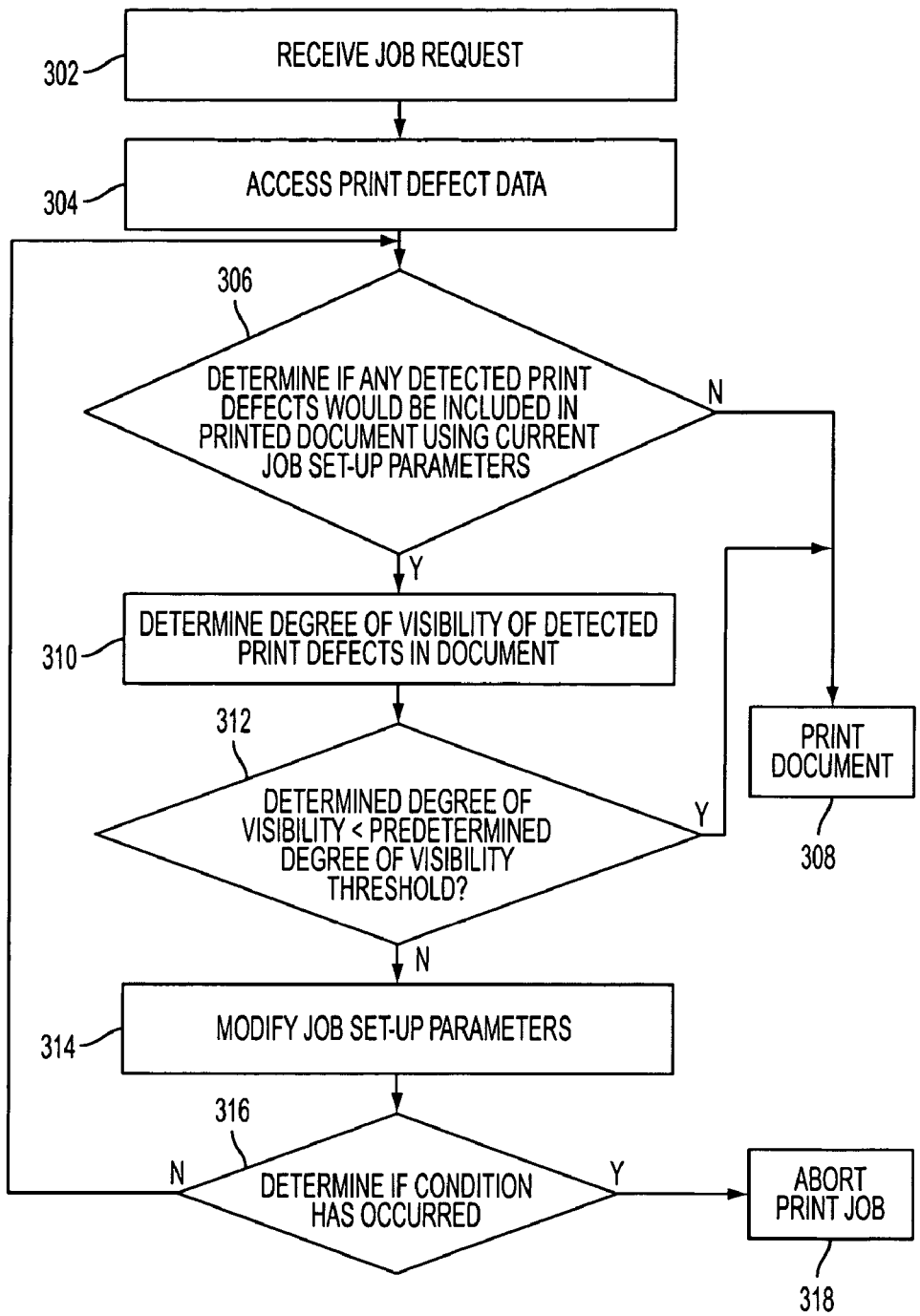
FIG. 3 is a flowchart illustrating steps performed by a defect visibility server in accordance with the configuration of the present disclosure shown in FIG. 1.

FIG. 3 shows a flowchart of exemplary steps of a method performed by the defect visibility server 102 shown in FIG. 1. At step 302, a job request is received for printing a document, wherein the job request includes a printer-ready document and job set-up parameters. The received job set-up parameters are designated to be the current job set-up parameters. At step 304, print defect data corresponding to the printer 112 is accessed, where the print defect data includes data corresponding to the location on the print marking means 117 of the printer 112 that corresponds to detected print defects, and to the type of detected print defects. At step 306, it is determined if any of the detected print defects would be included in a printed document using the current job set-up parameters. This includes determining if locations and color separation information within the print marking means 117 of the printer 112 that correspond to the detected print defects would be included in the area of the print marking means 117 that is used for transferring the image corresponding to the received printer-ready document to a substrate.

If the determination of step 306 is negative, step 308 is executed, in which the document is printed using the current job set-up parameters, including finishing the document in accordance with the job set-up parameters. The finishing may include compensating for modifications that were made to the job set-up parameters for printing the document. If the determination at step 306 is positive, step 310 is executed. At step 310, the content of the printer-ready document and the type of the print defects which would be included in the printed document are examined for determining a degree of visibility of the detected print defects in the document if it were printed. At step 312, the determined degree of visibility is compared to a predetermined degree of visibility threshold. If the visibility is below a predetermined degree of visibility threshold, step 308 is executed and the document is printed using the current job set-up parameters, including compensating for modifications that were made to the job set-up parameters for printing the document before performing any finishing operations on the printed document.

If the degree of visibility is above the predetermined degree of visibility threshold, step 314 is executed. At step 314, the job set-up parameters are modified, and the modified job set-up parameters are designated to be the current job set-up parameters. At step 316, a determination is made if a condition has occurred, such as a time-out and/or the number of times step 316 is executed exceeds a repetition threshold. If the condition occurs, the print operation is aborted at step 318. Otherwise, step 306 is repeated.

Those skilled in the art will appreciate that other methods could be performed by the defect visibility server 102 for minimizing print defect visibility. For example, the job set-up parameters could be modified before examining the content of the printer-ready document for attempting to find a set of job set-up parameters that could be used in which no print defects or minimal print defects would be included in the document when printed. Furthermore, where the content of the printer-ready document is known and categorized, such as by using segmentation techniques e.g., based on color and/or degree of uniformity, the job set-up parameters may be selected intelligently, including using the knowledge about the content of the printer-ready document and type of print defects.

The disclosed system and method advantageously improve the quality of printed output by eliminating or minimizing the visibility of print defects related to anomalies which cause localized and predicable print defects. The likely result is an improvement in user satisfaction and a decrease in requests for servicing of equipment for correction of print defects. Furthermore, printer unavailability due to faulty operation and/or servicing is minimized, and the life of the printer 112 and associated components and subsystems may be extended.

It will be appreciated that various of the above-disclosed and other features and functions, or alternatives thereof, may be desirably combined into many other different systems or applications. The claims can encompass embodiments in hardware, software, or a combination thereof. Also that various presently unforeseen or unanticipated alternatives, modifications, variations or improvements therein may be subsequently made by those skilled in the art which are also intended to be encompassed by the following claims.

The invention claimed is:

1. A printing system, comprising:
   a printer having a print marking means for printing a printer-ready document, including transferring or applying an image associated with the printer-ready document to a substrate using at least one color plane; and
   a processor assembly in operative communication with the printer, wherein the processor assembly executes application software for receiving a print job request including the printer-ready document, the processor assembly comprising:
   a first module for accessing print defect data related to at least one print defect, each print defect caused by a defect in the printer; and
   a second module for modifying the printing in accordance with the print defect data for minimizing visibility of the at least one print defect in the printer-ready document once printed;
   wherein the print defect data includes location information describing a location of the at least one print defect relative to the print marking means; and wherein the modifying the printing for minimizing the visibility of the print defect by the second module includes modifying a position of the substrate relative to the location information.

2. The printing system according to claim 1, wherein the modifying the printing by the second module further includes modifying at least one of content of the printer-ready document to be printed relative to the location and content of the printer-ready document to be printed relative to the substrate.

3. The printing system according to claim 2, wherein the modifying the printing by the second module includes predicting a degree of visibility of the at least one print defect for a printing of the printer-ready document after providing for modifying at least one of the content and the position of the substrate and before the printer-ready document is actually printed, determining if any of the predicted degrees of visibility exceed a predetermined threshold, if not providing for printing the printer-ready document, and if so, providing for making another modification of at least one of the content and the position of the substrate.

4. The printing system according to claim 1, wherein the printer further comprises a substrate positioning mechanism for at least one of providing the substrate and positioning the substrate relative to the print marking means;
wherein the modifying the printing for minimizing the visibility of the print defect by the second module includes controlling the substrate positioning mechanism.

5. The printing system according to claim 4, wherein the print job request further includes job set-up parameters for controlling at least one of content of the printer-ready document relative to the print marking means, and the substrate positioning mechanism during printing;
wherein the modifying the printing by the second module includes modifying the job set-up parameters;
wherein the print defect data further includes at least one of color separation information indicative of a color plane of the at least one color plane or combination of color planes of the at least one color plane which corresponds to the at least one print defect and type information indicative of a type of a print defect of the at least one print defect; and
wherein the type includes at least one of intensity and size of the at least one print defect.

6. The printing system according to claim 4, wherein the modifying the printing for minimizing the visibility of the print defect by the second module includes performing at least one of the following before printing:
(a) controlling at least one of rotating or translating the substrate to be printed on relative to the print marking means when providing for controlling the substrate positioning mechanism and controlling at least one of rotating or translating content of the printer-ready document so that the rotated or translated content of the printer-ready document coincides with the rotated or translated substrate; and
(b) rotating the content of the printer-ready document 180 degrees.

7. The printing system according to claim 6, wherein the printer-ready document includes at least two pages, and the modifying the printing is individually performed for respective pages of the at least two pages.

8. The printing system according to claim 7, wherein when the substrate is rotated or translated for at least one page of the at least two pages before the respective pages of the at least one page are printed, a compensation is performed after the printing, including at least one of:

modifying a finishing procedure specified by job set-up parameters for the printer-ready document to accommodate for the rotation or translation of the substrate associated with the at least one page; and
rotating or translating a substrate associated with respective pages of the at least one page after the printing to compensate for the rotating or translating before the printing of the respective substrates associated with the at least one page.

9. The printing system according to claim 7, wherein the modifying is individually performed when the at least two pages are simplex and when the at least two pages are duplex.

10. The printing system according to claim 1, wherein the modifying the printing by the second module includes generating human readable commands for presentation to a human operator instructing the human operator to modify at least one of content of the printer-ready document to be printed relative to the location information, and a position of the substrate relative to the location information.

11. The printing system according to claim 1, wherein the modifying the printing by the second module includes determining content of the printer-ready document, predicting before the printing a degree of visibility of the at least one print defect for printing of the printer-ready document based on the content of the printer-ready document relative to the location information, and modifying the printing in accordance with results of the predicting.

12. The printing system according to claim 11, wherein the predicting includes using at least one imaging analysis technique.

13. The printing system according to claim 1, wherein the modifying the printing by the second module includes segmenting the printer-ready document into at least two segments based on a characteristic of the printer-ready document including at least one of color and uniformity, and then predicting a degree of visibility of the at least one print defect for each segment of the at least two segments based on the characteristic of a the segment, a type associated with the at least one print defect, and the location information.

14. The printing system according to claim 1, wherein the processor assembly further comprises a third module for receiving an image corresponding to a document printed by the printer and job set-up parameters used for printing the printed document, analyzing the image for detecting the at least one print defect in the received image, and generating the print defect data corresponding to the at least one print defect.

15. The printing system according to claim 14, wherein the printer further comprises a scanner device for scanning in a document printed by the printer, generating a corresponding image and providing the generated image to the image analyzer module.

16. The printing system according to claim 15, wherein the printer further comprises a transport mechanism for providing a printed document to the scanner device.

17. A method for minimizing visibility of print defects when printing using a printer, the printer having a print marking means for printing a printer-ready document, including transferring or applying an image associated with the printer-ready document to a substrate using at least one color plane, the method comprising:
receiving a print job request including the printer-ready document;
accessing print defect data related to at least one print defect including location information describing a location of the at least one print defect relative to the print marking means; and modifying the printing in accordance with the print defect data for minimizing visibility of the at least one print defect in the printer-ready document once printed;
wherein the modifying the printing includes:
  determining content of the printer-ready document;
  predicting before the printing a degree of visibility of the at least one print defect for printing of the printer-ready document based on the content of the printer-ready document relative to the location information; and
  modifying the printing in accordance with results of the predicting; and
wherein each print defect is caused by a defect in the printer and is associated with an anomaly which is associated with a particular location within at least one of the print marking means and the color plane;
wherein the modifying the printing for minimizing the visibility of the print defect includes modifying the format or size of a selected graphical or textual element included in the printer-ready document
wherein the modifying the printing comprises providing for modifying at least one of content of the printer-ready document to be printed relative to the location information, content of the printer-ready document to be printed relative to the substrate, and a position of the substrate relative to the location information;
wherein the modifying the position of the substrate comprises at least one of:
  providing the substrate; and
  positioning the substrate relative to the print marking means; and,
wherein the positioning the substrate comprises:
  controlling at least one of rotating or translating the position of the substrate to be printed on relative to the print marking means.

18. The method according to claim 17, wherein the job print request further includes job set-up parameters for controlling at least one of the content of the printer-ready document, and the position of the substrate relative to the print marking means during printing, and the modifying the printing includes modifying the job set-up parameters.

19. The method according to claim 17, wherein the predicting includes using at least one imaging analysis technique.

20. The method according to claim 17, wherein the modifying the printing comprises:
  segmenting the printer-ready document into at least two segments based on a characteristic of the printer-ready document including at least one of color and uniformity; and
  predicting a degree of visibility of the at least one print defect based on the characteristic of a segment of the at least two segments, a type associated with the at least one print defect, and the location information.

* * * * *